Sept. 20, 1971   J. F. BENSON   3,606,099
APPARATUS FOR THE UNIFORM DELIVERY OF GRANULAR MATERIAL
Filed Jan. 26, 1970
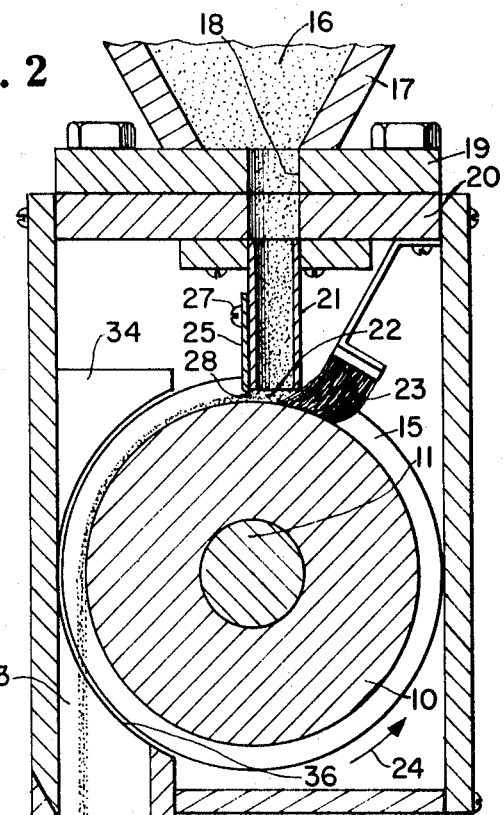
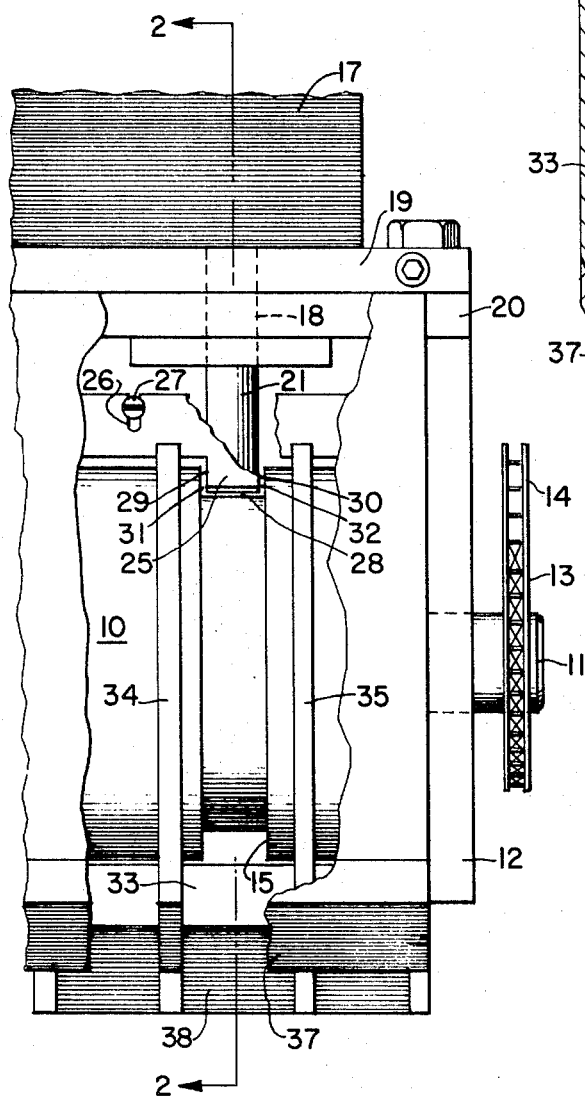
INVENTOR.
John F. Benson
BY *Fredrick H. Brown*
ATTORNEY United States Patent Office 3,606,099
Patented Sept. 20, 1971

3,606,099
APPARATUS FOR THE UNIFORM DELIVERY OF GRANULAR MATERIAL
John F. Benson, Cincinnati, Ohio, assignor to The Procter & Gamble Company, Cincinnati, Ohio
Filed Jan. 26, 1970, Ser. No. 5,613
Int. Cl. G01f 13/00
U.S. Cl. 222—312        8 Claims

ABSTRACT OF THE DISCLOSURE

An apparatus for continuously delivering a uniform supply of granular material, e.g. granular table salt, for application upon the surface of edible products, e.g. potato chips, moving beneath the applicator apparatus. The applicator is characterized by a continuously rotating drum having an annular groove which receives granular material from a feed tube projecting into the groove. An adjustable flow control gate projects radially into the groove. A flow control slot is formed between the gate and the groove which may be varied in width to control the flow of granules as the drum rotates. Granules flowing through the slot are conveyed in the groove to a chute where they fall by gravity until striking a series of baffles whereupon they are deposited upon the surface of the product being coated.

CROSS REFERENCE TO RELATED APPLICATION

The applicator apparatus of the invention has relatively wide utility in the feeding of granular or powdery materials. In a preferred embodiment it is used in conjunction with an automatic machine for making potato chips such as that disclosed and claimed in the co-pending application of Robert G. MacKendrick, Ser. No. 763,728, filed Sept. 30, 1968, now Pat. No. 3,520,248 which is entitled Chip Frying Machine, said latter application being commonly owned by the assignee of the present application.

BACKGROUND OF THE INVENTION

The continuous application of a uniform coating of granular material such as salt upon the surface of moving products is a relatively difficult task. For example, in the application of salt to potato chips it is necessary to provide an applicator which will assure uniform high product quality by delivering salt constantly at a uniform rate so that each of the chips has a reasonably uniform taste within relatively narrow limits. A device of this kind must be capable of operation continuously with a minimum of malfunction and yet it must deliver a continuous flow of granules without jamming or crushing the granules in its operating mechanism since this would inhibit flow and, in addition, it would minimize the life of the apparatus. Additionally, a device of this kind must incorporate means for distributing the salt granules uniformly over the surface of the chips and the granules must be delivered at relatively low velocity so they will not "bounce" from the surfaces and thus be ineffective.

SUMMARY OF THE INVENTION

The nature and substance of the invention will be more readily appreciated after giving consideration to its principal aims and purposes. These objectives are recited in the ensuing paragraphs.

A major object of the invention is the provision of an apparatus for the uniform delivery of granular material which will deliver the material at a predetermined flow rate with a high degree of precision.

Another object of the invention is the provision of an apparatus of the above character in which there is sufficient clearance between the several moving parts to obviate jamming, crushing and sticking of granular particles for the purpose of minimizing wear on the parts and to preclude unnecessary shutdown due to malfunction.

A further object of the invention is the provision of an apparatus for the uniform delivery of granular material in which the rate of delivery of granules is controlled by openings or slots between the several moving parts as well as the inherent angle of repose of the granular material in order to provide the user with a desired predetermined flow rate.

Still a further object of the invention is the provision of an apparatus of the above character which may incorporate a series of baffles to retard the free fall of the granular material to permit gentle application thereof on the surface of the articles being coated thus preventing "bounce" of granules therefrom.

These and other objects of the invention are achieved by providing an apparatus for uniform delivery of granular material comprising a rotating drum having at least one annular groove on its periphery, there being a feed tube provided for receiving granular material and delivering same to the upper portion of the groove. A flow control gate is provided which projects radially into the groove. A slot is formed beneath the gate which may be varied in width to control the outflow of granules as the drum rotates. A sealing device is provided on the rearward side of the tube for the purpose of preventing backflow of granules counter to the direction of drum rotation. The granules are delivered to a vertically disposed chute where they may impinge against a series of baffles to break their fall prior to the application of the granules upon the products being coated.

BRIEF DESCRIPTION OF THE DRAWING

While the specification concludes with claims particularly pointing out and distinctly claiming the subject matter regarded as forming the present invention, it is believed the invention will be better understood from the following description taken in connection with the accompanying drawing in which:

FIG. 1 is a fragmentary side elevation illustrating the several cooperating elements of the apparatus of the invention.

FIG. 2 is an end elevation of the apparatus in cross section taken on the line 2—2 of FIG. 1 further illustrating the components of the device.

DESCRIPTION OF THE PREFERRED EMBODIMENT

Referring now to the drawings, the apparatus of the invention is illustrated in a preferred form. As shown in FIGS. 1 and 2, the apparatus comprises a drum 10 mounted for continuous rotation on the shaft 11 which is suitably supported, for example, by being journalled in the end plate 12, there being a similar end plate (not shown) for supporting the other end of the shaft 11. A sprocket 13 is secured to the shaft 11 and is driven by the chain 14. The chain 14 is in turn synchronously driven from a drive sprocket (not shown) which forms a part of the machine delivering the product under treatment, e.g. the chip frying machine as described and claimed in the previously cited MacKendrick application.

An annular groove 15 is formed in the peripheral surface of the drum 10 as shown in FIG. 1. It will be understood that additional annular grooves 15 may be formed at spaced intervals along the length of the drum 10 depending upon the number of dispensing stations that are desired.

Means are provided for continuously delivering granular material, preferably salt granules, into the upper portion of the annular groove 15. The granular material 16 (FIG. 2) is supplied from a hopper 17 and flows by gravity through the aperture 18 in the plates 19 and 20. A feed tube 21 projects downwardly from the aperture 18 to deliver the granules into the upper portion of the annular groove 15. The unrestricted flow of granular material 16 from the hopper 17 to the outlet of the feed tube 21 permits the maintenance of a choked flow condition at the outlet of the tube 21 and in the adjoining space of the groove 15.

Preferably, the tube 21 projects into the groove 15 with substantial clearance at the bottom and sides. It will be noted in making reference to FIG. 2 that a gap 22 is formed beneath the lower end of the feed tube 21 so that it does not touch the bottom of the annular groove 15. Similarly, the outside of the feed tube 21 has substantial clearance with respect to the side surfaces of the annular groove 15 (see FIG. 1). These clearances are sufficient to prevent contact between the feed tube 21 and the annular groove 15 as the drum 10 is continuously rotated.

Seal means are provided to prevent backflow of the granular material 16 during the operation of the apparatus. These seal means may include a brush 23 secured to the underside of the plate 20. The bristles of the brush 23 extend into and fill the annular goove 15 as illustrated in FIG. 2. It will be appreciated that on rotation of the drum 10 in the direction of the arrow 24, the brush 23 will prevent backflow of the granular material 16 being introduced through the feed tube 21.

Means are also provided for controlling the rate of forward flow of granular material beyond the feed tube 21. An adjustable flow control gate 25 is used for this purpose. As illustrated in FIG. 1, the contour of the gate 25 corresponds substantially with the contour of the groove 15. The gate 25 extends radially inwardly with respect to the drum 10 and is provided with means for radial adjustment which may include a slot 26 and a screw 27. The radial position of the gate 25 is adjusted in order to control the size of the slot 28 shown in FIG. 2. The width of the slot 28, the inherent angle of repose of the granular material 16 and the speed of rotation of the drum 10 control the rate at which the granular material 16 flows under the slot 28. It will be clear, of course, that for a given granular material the angle of repose will be constant. Generally, the speed of rotation will be fixed since the apparatus is directly driven in unison with a machine that is designed for reasonably constant speed operation. As a consequence, flow control is most readily and easily controlled by adjusting the width of the slot 28.

It should also be pointed out that the gate 25 is constructed so that its side edges 29 and 30 are spaced from the side surfaces of the annular groove 15 so that clearances 31 and 32 are provided. The clearances 31 and 32 are of predetermined size to prevent jamming of granules between the side edges 29 and 30 of the gate 25 and the side surfaces of the groove 15. Preferably, the clearances 31 and 32 are at least twice as large as the diameter of the average granule being handled. This has been found sufficient to prevent jamming and sticking of granules between these contiguous surfaces which would adversely affect the smooth and efficient operation of the apparatus. A certain fixed flow of granules will occur through the clearances 31 and 32. However, the quantity passing through the clearances 31 and 32 is of comparatively small magnitude and is essentially constant regardless of the width of the slot 28.

A feed chute 33 is provided to receive the granules delivered from the drum 10 and to guide them as they fall by gravity for delivery to the product being coated. The chute 33 includes side plates 34 and 35 (FIG. 1) which are contoured as at 36 (FIG. 2) to limit lateral movement of the falling granules as they are delivered.

Baffle means are provided in the lower portion of the chute 33 which may include a first baffle 37 and a second baffle 38. The granules strike the baffles 37 and 38 in succession whereupon they are deposited upon the article or product being processed which passes continuously beneath the opening 39. The baffles serve to reduce the velocity of the falling granules and thus assure their delivery to the surface of the product at a sufficiently low velocity that the majority of the granules will stick to the product rather than bounce off. As the granules are delivered from the groove 15 and as they fall by gravity in the chute 33, they tend to spread laterally and form a uniformly thin stream. As a consequence, the stream of granules 40 issuing continuously from the opening 39 is of substantially uniform density and is of about the width of the spacing between the side plates 34 and 35.

As previously discussed, the device illustrated in FIGS. 1 and 2 includes a drum 10 having a single annular groove 15 and a corresponding chute 33 as well as individual units of each of the other associated elements and components. It will be appreciated from an examination of FIG. 1 that a fragmentary showing of the device was made primarily for convenience of illustration. If one desired to dispense additional streams of granules from the drum 10, it would only be necessary to extend the length of the drum 10 sufficiently to add a desired number of annular grooves 15 and corresponding chutes 33 as well as providing a complete set of each of the several other elements and components for each groove.

It is also possible to provide a plurality of grooves which deliver granules at differing rates. This latter result can be accomplished by using a drum with several grooves of different width or by adjusting each gate in each groove individually to obtain a different predetermined rate of outflow. In the latter cases, the delivery from each groove will remain in a fixed ratio even when the speed of rotation of the drum is varied.

While such multiplicity is not a necessary function of the present invention, it is believed the foregoing description and illustration of a device for dispensing a single stream of granules will make apparent the practical potential of the basic concept involved in the present apparatus. In practice, an apparatus having four annular grooves has been successfully operated in conjunction with a chip frying machine which delivers four lines of potato chips simultaneously.

While particular embodiments of the invention have been illustrated and described it will be obvious to those skilled in the art that various changes and modifications can be made without departing from the spirit and scope of the invention and it is intended to cover in the appended claims all such changes and modifications that are within the scope of this invention.

What is claimed as new is:

1. Apparatus for the uniform delivery of granular material comprising a rotating drum, said drum having an annular groove on its periphery, a feed tube for delivering a choked flow of granular material to the upper portion of said annular grooves, said feed tube projecting into said groove without contacting the bottom or side surfaces thereof, a flow control gate projecting radially into said groove forward of said tube with respect to the direction of drum rotation, a slot between the lower edge of the gate and the annular surface of the groove for controlling the rate of outflow of granules from beneath said gate, sealing means located rearward of said tube with respect to the direction of drum rotation, said sealing means cooperating with said groove to prevent flow of granules in said groove counter to the direction of drum rotation, and a chute for receiving the granules delivered continuously from said groove of said rotating drum.

2. Apparatus for the uniform delivery of granular material as claimed in claim 1 wherein said gate includes side edges which have a clearance with respect to the side surfaces of the groove which is at least about twice the average diameter of the granules being delivered.

3. Apparatus for the uniform delivery of granular material as claimed in claim 2 including baffle means in the lower portion of said chute to retard the free fall of granules therein prior to their delivery therefrom.

4. Apparatus for the uniform delivery of granular material as claimed in claim 2 wherein said sealing means includes a brush having bristles extending into and filling said annular groove at the upstream side of said feed tube with respect to the direction of drum rotation.

5. Apparatus for the uniform delivery of granular material as claimed in claim 2 including baffle means in the lower portion of said chute to retard the free fall of granules therein prior to their delivery therefrom, said sealing means including a brush having bristles extending into and filling said annular groove on the upstream side of said feed tube with respect to the direction of drum rotation.

6. Apparatus for the uniform delivery of granular material as claimed in claim 1 including baffle means in the lower portion of said chute to retard the free fall of granules therein prior to their delivery therefrom.

7. Apparatus for the uniform delivery of granular material as claimed in claim 6 wherein said sealing means includes a brush having bristles extending into and filling said annular groove on the upstream side of said feed tube with respect to the direction of drum rotation.

8. Apparatus for the uniform delivery of granular material as claimed in claim 1 wherein said sealing means includes a brush having bristles extending into and filling said annular groove on the upstream side of said feed tube with respect to the direction of drum rotation.

References Cited

UNITED STATES PATENTS

| | | | |
|---|---|---|---|
| 95,149 | 9/1869 | Schopp | 222—314 |
| 836,414 | 11/1906 | Toles | 178—308X |
| 2,030,541 | 2/1936 | Rose | 222—311X |
| 2,404,454 | 7/1946 | Owens | 118—320X |

JOHN P. McINTOSH, Primary Examiner

U.S. Cl. X.R.

222—342, 414; 118—24, 308